United States Patent
Chesnokov

(10) Patent No.: US 10,694,203 B2
(45) Date of Patent: Jun. 23, 2020

(54) IMAGE PROCESSING

(71) Applicant: Apical Ltd, Cambridge (GB)

(72) Inventor: Viacheslav Chesnokov, Loughborough (GB)

(73) Assignee: Apical Limited, Cambridge (GB)

( * ) Notice: Subject to any disclaimer, the term of this patent is extended or adjusted under 35 U.S.C. 154(b) by 271 days.

(21) Appl. No.: 15/851,029

(22) Filed: Dec. 21, 2017

(65) Prior Publication Data

US 2018/0184100 A1 Jun. 28, 2018

(30) Foreign Application Priority Data

Dec. 22, 2016 (GB) .................................. 1622038.6

(51) Int. Cl.
| | | |
|---|---|---|
| *G06K 9/00* | (2006.01) | |
| *H04N 19/467* | (2014.01) | |
| *H04N 19/463* | (2014.01) | |
| *H04N 9/804* | (2006.01) | |
| *H04N 5/76* | (2006.01) | |
| *H04N 5/91* | (2006.01) | |
| *H04N 19/70* | (2014.01) | |
| *H04N 19/85* | (2014.01) | |

(52) U.S. Cl.
CPC ............. *H04N 19/467* (2014.11); *H04N 5/76* (2013.01); *H04N 5/91* (2013.01); *H04N 9/8042* (2013.01); *H04N 19/463* (2014.11); *H04N 19/70* (2014.11); *H04N 19/85* (2014.11)

(58) Field of Classification Search
None
See application file for complete search history.

(56) References Cited

U.S. PATENT DOCUMENTS

| | | | |
|---|---|---|---|
| 6,862,102 B1 * | 3/2005 | Meisner | H04N 1/33323 345/660 |
| 8,472,754 B1 | 6/2013 | Harkness et al. | |
| 8,831,367 B2 * | 9/2014 | Venkataraman | H04N 13/128 382/233 |

(Continued)

FOREIGN PATENT DOCUMENTS

| | | |
|---|---|---|
| EP | 3086558 A1 | 10/2016 |
| WO | 2017053852 A1 | 3/2017 |

OTHER PUBLICATIONS

Combined Search and Examination Report dated Jun. 23, 2017 for Application No. GB1622038.6.

*Primary Examiner* — Soo Jin Park
(74) *Attorney, Agent, or Firm* — EIP US LLP

(57) ABSTRACT

A method including receiving image data including encoded image data to be decoded to generate decoded image data representing an image and additional data to be read and used to modify the decoded image data. The encoded image data is decoded using an image decoder to generate the decoded image data and the decoded image data is modified based on the additional data to generate modified decoded image data representing the image after modification. Graphics computer program code associated with a programming interface for a graphics processor is derived from at least part of the additional data. The graphics computer program code is for modification of the decoded image data. The decoded image data, along with the graphics computer program code, is passed to the programming interface for modification of the decoded image data.

20 Claims, 5 Drawing Sheets

(56) References Cited

U.S. PATENT DOCUMENTS

| | | | |
|---|---|---|---|
| 9,514,392 B2* | 12/2016 | Wee | G06K 9/80 |
| 2007/0292035 A1* | 12/2007 | Lee | H04N 19/70 |
| | | | 382/232 |
| 2009/0161017 A1 | 6/2009 | Glen | |
| 2011/0033170 A1 | 2/2011 | Ikeda et al. | |
| 2013/0077880 A1* | 3/2013 | Venkataraman | H04N 13/128 |
| | | | 382/232 |
| 2015/0243200 A1 | 8/2015 | Pan | |

* cited by examiner

IMAGE PROCESSING

CROSS-REFERENCE TO RELATED APPLICATIONS

This application claims priority to British Application No. GB 1622038.6, filed Dec. 22, 2016 under 35 U.S.C. § 119(a). The entire contents of the above-referenced patent application are hereby incorporated by reference.

FIELD OF THE DISCLOSURE

The present disclosure relates to a method and a computing device for processing an image.

BACKGROUND

It is known to encode data representing an image, for example to reduce the size of the data for more efficient storage and transfer. The data can subsequently be decoded so the image can be displayed.

It is desirable to provide a method of processing an image that provides for more flexibility in image decoding so as to provide for user interactivity with decoded image data representing the image.

SUMMARY

According to some embodiments, a method is provided. The method includes receiving image data including a first data type including encoded image data to be decoded to generate decoded image data representing an image, and a second data type including additional data to be read and used to modify the decoded image data. The method includes decoding the encoded image data using an image decoder to generate the decoded image data. The method includes modifying the decoded image data based on the additional data to generate modified decoded image data representing the image after modification. The method includes deriving computer program code from at least part of the additional data. The computer program code is graphics computer program code associated with a programming interface for a graphics processor. The graphics computer program code is for modification of the decoded image data. The method includes passing the decoded image data, along with the graphics computer program code, to the programming interface for the graphics processor for modification of the decoded image data.

According to some other embodiments, a method is provided. The method includes receiving image data. The method includes determining a format of the image data from at least a first format in which the image data includes a first data type including encoded image data to be decoded to generate decoded image data representing an image, and a second format in which, in addition to including the first data type including encoded image data to be decoded to generate the decoded image data representing an image, also includes a second data type including additional data to be read and used to modify the decoded image data. The method includes, in response to determining that the format is the first format, decoding the encoded image data using an image decoder to generate the decoded image data. The method includes, in response to determining that the format is the second format, decoding the encoded image data using an image decoder to generate the decoded image data, and modifying the decoded image data based on the additional data to generate modified decoded image data representing the image after modification. The method includes, in response to determining that the format is the second format, deriving computer program code from at least part of the additional data. The computer program code is graphics computer program code associated with a programming interface for a graphics processor. The graphics computer program code is for modification of the decoded image data. The method includes, in response to determining that the format is the second format, passing the decoded image data, along with the graphics computer program code, to the programming interface for the graphics processor for modification of the decoded image data.

According to yet other embodiments, a computing device is provided. The computing device includes storage for storing image data including a first data type including encoded image data to be decoded to generate decoded image data representing an image, and a second data type including additional data to be read and used to modify the decoded image data. The computing device includes at least one processor communicatively coupled to the storage. The at least one processor includes a graphics processor. The computing device includes a programming interface for the graphics processor. The computing device includes an image reader operable to decode the encoded image data to generate the decoded image data, read the additional data, and derive computer program code from at least part of the additional data. The computer program code is graphics computer code associated with the programming interface for the graphics processor. The programming interface for the graphics processor is operable to receive the decoded image data, along with the graphics computer program code, and modify the decoded image data based on the graphics computer program code to generate the modified decoded image data.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

Figure 1:
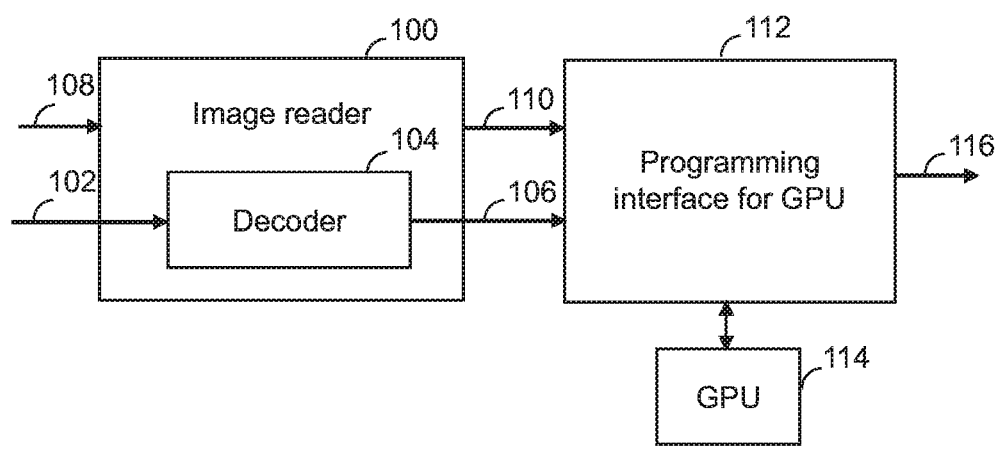
FIG. 1 is a schematic diagram showing a method according to examples.

Details of the method according to examples will become apparent from the following description, with reference to the figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a method including receiving image data. The image data includes a first data type comprising encoded image data to be decoded to generate decoded image data representing an image and a second data type comprising additional data to be read and used to modify the decoded image data. The second data type may be considered an optional data type in the sense that it is available to be read but that reading of the additional data is not obligatory or required for the image data to be processed. In other words, the image data can be processed without reading or processing of the second data type comprising the additional data.

For example, the additional data may be read where the image data is received by an image reader that recognizes and is capable of handling the format of the additional data. However, in other cases in which the image data is received by an image reader that is incapable of reading the additional data, such as an older or legacy image reader, the additional data may be ignored or not read. In such cases, the encoded image data may be read without reading the additional data. This means that the image data is backwards compatible with previous image readers that haven't yet been upgraded to handle the additional data. Accordingly, the encoded image data can be decoded by both legacy image readers without reading of the additional data and by newer or upgraded image readers that can read the additional data and use it to modify the decoded image data. The method therefore allows the encoded image data to be decoded by a range of different decoders, ensuring compatibility with a range of different systems.

The method according to examples further includes decoding the encoded image data using an image decoder to generate the decoded image data and deriving computer program code from at least part of the additional data. The computer program code is graphics computer program code associated with a programming interface for a graphics processor (to be described further below), and is for modification of the decoded image data. The decoded image data is passed, along with the graphics computer program code, to the programming interface for the graphics processor for modification of the decoded image data. The decoded image data is modified based on the additional data to generate modified decoded image data representing the image after modification. Accordingly, the method according to examples allows the decoded image data to be modified in cases in which the additional data can be read. The modification can for example be used to improve an image quality of the image or to allow a user to interact with the image. However, as explained above, if the additional data cannot be read, the image without modification can still be decoded successfully. This allows the image to be decoded and displayed, either with or without modification depending on the nature of the image reader, without requiring the image reader to also be capable of reading the additional data. The method therefore provides flexibility for the processing of encoded image data.

FIG. 1 illustrates the method according to examples. In FIG. 1, image data is received, in this example by an image reader 100. The image reader 100 may be implemented by or included in a web browser. For example, the image data may be received via a web browser capable of reading encoded image data and additional data (discussed further below) of the image data.

In the example of FIG. 1, the image data includes a first data type comprising encoded image data 102, which represents an image. The image may be the entire or whole image or a portion, part or subset of a larger image. The image is for example an image from a web page accessed by a web browser of a computing device, such as a web browser of a smartphone; an image captured by an image capture device, such as a camera, of the computing device; or an image downloaded to or stored in storage of the computing device. The image may include any graphical or visual content, for example text, graphics, pictures, and/or photographs. The image may be a still or moving image, such as a video image. The encoded image data may be in any suitable encoded or compressed format for representing images. Common formats include the JPEG (Joint Photographic Experts Group, ISO/IEC 10918) format, which is typically an 8-bit format, or the JPEG XT (ISO/IEC 18477) format, which is typically a more than 8-bit format.

The image reader 100 of FIG. 1 includes a decoder 104. The decoder 104 may be any suitable decoder compatible with the encoded image data 102. For example, where the encoded image data 102 is in the JPEG or JPEG XT format, the decoder 104 may be a standard JPEG or JPEG XT decoder.

The decoder 104 receives and decodes the encoded image data 102 to generate decoded image data 106. As the skilled person will appreciate, the decoded image data 106 may include the intensity values of each pixel of the image, which may be stored with a greyscale or brightness level of, for example, from 0 to 255 per color band or color channel for 8-bit data such as JPEG data. A greyscale level of 0 for example corresponds with a darkest intensity (e.g. black) and a greyscale level of 255 for example corresponds with a lightest intensity (e.g. white), with greyscale levels between 0 and 255 corresponding with an intermediate intensity between black and white. The decoded image data 106 may also include color data, relating to the color of the image represented by the decoded image data 106. For example, when the image is a color image, a pixel value of an intensity or brightness or each pixel may be stored separately for each color channel. If a pixel is represented by, for example, three primary colors such as in the RGB (red, green, blue) or YUV color spaces (where Y represents the luma of the color, U represents the difference between the blue component of the color and the luma and V represents the difference between the red component of the color and the luma), the visual appearance of each pixel may be represented by three intensity values, one for each primary color. As will be appreciated by the skilled person, the encoded image data 106 may represent the image using any suitable representation, which may be different from the examples set out above, which are merely illustrative.

The image data in the example of FIG. 1 also includes a second data type comprising additional image data 108. In this case, the image reader 100 is capable of reading the additional image data 108 as well as the encoded image data 102. This typically refers to the image reader 100 being able to access and parse the additional image data 108, for example with the contents of the additional image data 108 being visible to the image reader 100. The image reader 100 in FIG. 1 is shown as performing the reading of the additional image data 108 however in other examples the decoder 104 may read and/or decode the additional image data 108 in addition to decoding the encoded image data 106 or an alternative component or module than the image reader may read the additional image data 108.

The additional image data 108 may be metadata associated with the encoded image data 102. For example, where the encoded image data 102 is in the form of a JPEG or a JPEG XT, the additional image data 108 may be stored in the Exchangeable Image File Format (EXIF). The EXIF data may be embedded within a file including the encoded image data 102, for example within a JPEG or JPEG XT file. Typically, EXIF data is stored in a header of a JPEG or JPEG XT. For example, EXIF data may be stored in one of the utility Application Segments of the JPEG or JPEG XT, generally the APP1 (segment marker 0xFFE1), although other segments may be used. In this example, the image reader 100 may therefore be a JPEG or JPEG XT decoder that is capable of reading the additional image data 108 and decoding the encoded image data 102.

The image reader 100 in the example of FIG. 1 is arranged to derive computer program code from at least part of the additional data, which may be graphics computer program code 110. Deriving the graphics computer program code 110 may include merely accessing a relevant portion of the additional data, for example the portion of the additional data corresponding to the graphics computer program code 110. In other examples, the graphics computer program code 110 may be derived from the additional data by processing the additional data. Such processing may include generating the graphics computer program code based on the additional data, for example where the additional data is computer program code operable to automatically generate further computer program code such as graphics computer program code. The computer program code and the graphics computer program code may be in any suitable programming language and may be compiled or assembled code, or source code that is human-readable. For example, the graphics computer program code 110 may be JavaScript code.

The decoded image data 106 and the graphics computer program code 110 are passed to a programming interface 112 for a graphics processor 114, for example by making a programming interface call. For example, the programming interface 112 may execute the graphics computer program code 110, for example using the graphics processor 114, which may take some or all of the decoded image data 106 as an input. A programming interface typically provides an interface between an application, in this instance an application with which images can be processed for example, and an underlying implementation, library, software, hardware or the operating system itself. For example, a programming interface may provide certain routines, data structures, objects, or functions that can be used by an application. However, the underlying implementation may be hidden so that the application (or a programmer of the application) does not need to know or understand how, for example, a particular function is implemented precisely. The programming interface 112 for the graphics processor 114 may be the Open Graphics Library (OpenGL) application programming interface (API), or the Web Graphics Library (WebGL) API, which may be integrated with a compatible web browser, for example. If the programming interface 112 is the OpenGL API or the WebGL API, the graphics computer program code 110 is for example code associated with the OpenGL or WebGL API, which may be written in JavaScript. For example, the graphics computer program code 110 may be executable to provide access to underlying functions of the OpenGL or WebGL API, which can be used to modify the decoded image data 106. For example, the graphics computer program code 110 may be used to call functions of the OpenGL or WebGL API, which are typically for rendering or drawing graphics in two or three dimensions, typically using a graphics processing unit (GPU) or other graphics processor to rapidly render images, as this may be more efficient than using software for image rendering.

The graphics computer program code 110 in this example is processed by the graphics processor 114, via the programming interface 112, to modify the decoded image data 106 to generate modified decoded image data 116 representing the image after modification. The graphics processor 114 in this example is a GPU such as an NVIDIA® GeForce ˆ GTX 980, available from NVIDIA®, 2701 San Tomas Expressway, Santa Clara, Calif. 95050, USA, although other graphics processors are possible. The image may be modified in various different ways by the graphics computer program code 110. For example, the graphics computer program code 110 may be used to translate, transform or otherwise alter the image, for example to adjust the dynamic range or contrast, either globally or locally. In the example of FIG. 1, the modification of the image is based on the graphics computer program code 110 without additional input. However, in other examples, the modification of the image may be based on further input, such as a user input or input relating to viewing conditions such as ambient light conditions, in addition to the graphics computer program code 110. For example, the graphics computer program code 110 may be adapted to receive this further input and modify the image on the basis of this further input. Further examples of modification of the image are given further below with reference to FIGS. 2 to 6.

The modified decoded image data 116 may then be received by a display device (not illustrated in FIG. 1) so that the image after modification can be displayed by the display device.

In FIG. 1, the image reader 100 is capable of reading both the encoded image data 102 and the additional data 104. The encoded image data 102 in examples such as FIG. 1 may be in a format compatible with a legacy image decoder, such as a JPEG decoder, which is not capable of deriving the graphics computer program code from the at least part of the additional data and passing the decoded image data, along with the graphics computer program code, to the programming interface for the graphics processor for modification of the decoded image data. For example, the encoded image data 102 may be in a form compliant with a standard JPEG decoder, such as the standard JPEG format or a JPEG XT format (which is typically also compliant with the JPEG standard). In this way, an existing image decoder can be used to decode the encoded image data 102. In other words, the encoded image data is backwards compatible with the legacy image decoder. This may simplify the use of the image data according to examples, as it can be used with existing or legacy image readers or decoders as well as upgraded image readers, such as that of FIG. 1, providing compatibility with a wide range of different computing systems.

Figure 2:
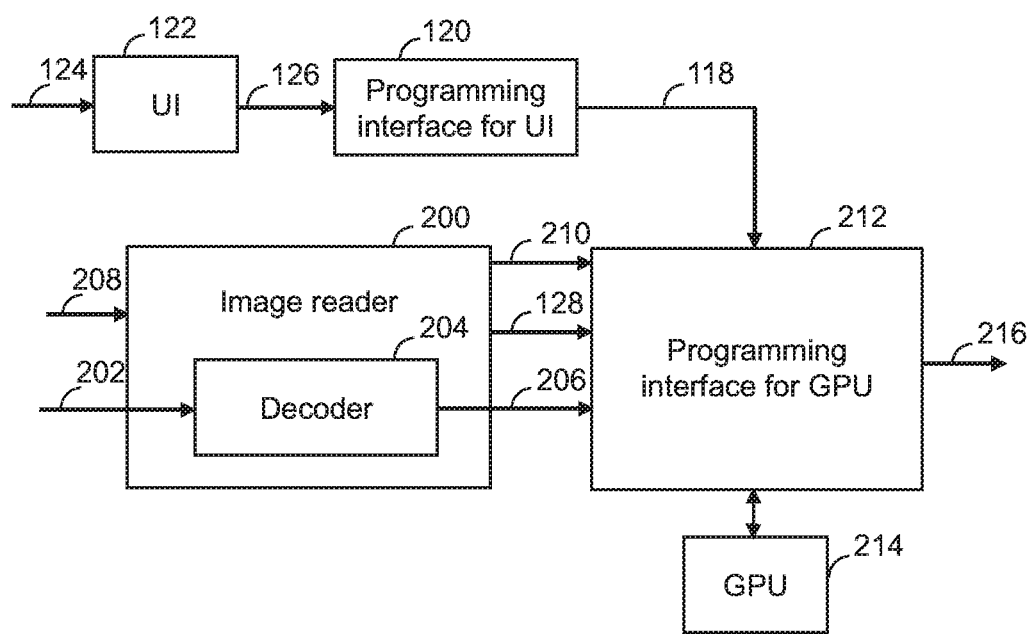
FIG. 2 is a schematic diagram showing a method according to further examples.

In the example of FIG. 1, the modification of the image depends on the additional data from which the graphics computer program code is derived. However, as noted above, in other examples, the image may be modified based additionally on other input than the additional data. FIG. 2 shows such an example. Features of FIG. 2 similar to those of FIG. 1 are labelled with the same reference numeral incremented by 100; corresponding descriptions are to be taken to apply.

In FIG. 2, alongside the decoded image data 206 and the graphics computer program code 210, user input 118 is also passed to the programming interface 112 for the graphics processor 114 for controlling the modification of the decoded image data 206 in accordance with the user input 118. In the example of FIG. 2, the user input 118 is received from a programming interface 120 for a user interface 122. For example, based on an interaction 124 between a user and a computing system or computing device hosting the user interface 122, interaction data 126 relating to the interaction 124 may be passed to the programming interface 120 for the user interface 122. There may, for example, be user interface computer program code for receiving the user input that is associated with the programming interface 120 for the user interface 122. The user interface computer program code may govern how the interaction 124 with the user interface 122 is passed to the programming interface 212 for the graphics processor 214.

In the example of FIG. 2, the user interface computer program code 128 is derived from the additional data as will be explained further below. However, in other examples, the user interface computer program code may be associated with a web page including the image and may be used to associate a particular user input, for example received via an interaction between the user and the web page or the content of the web page, with a particular modification of the decoded image data, and hence of the image, via the programming interface for the graphics processor. In these examples, the user interface computer program code may be executed by a web browser when a user accesses the web page including the image.

Regardless of the origin of the user interface computer program code, the user interface computer program code in examples may be used to call functions of the programming interface 120 for the user interface 122, which in turn may be used to call functions of the programming interface 212 for the graphics processor 214 to process the decoded image data 206 using the graphics processor 214. For example, the user interface computer program code may be JavaScript code and the programming interface 120 for the user interface 122 may be a JavaScript API. The JavaScript code may therefore be used to call or access functions associated with the JavaScript API.

The user interface computer program code may be in the same or a different language than the graphics computer program code. Although the example of FIG. 2 illustrates the programming interfaces 212, 120 for the graphics processor 214 and the user interface 122 as separate modules, in other examples these programming interfaces may be combined into one module. For example, the programming interface for the user interface may be omitted in some examples. In these examples, the user input may be received by the programming interface for the graphics processor.

As explained above, in the example of FIG. 2, the user interface computer program code 128 is derived from at least part of the additional data 200 received by the image reader 200 rather than receiving the user interface computer program code from a web page including the image. The user interface computer program code 128 in FIG. 2 is further computer program code, and is associated with the programming interface 212 for the user interface 122. The user interface computer program code 128 in this example is passed to the programming interface 212 for the graphics processor 214. Typically, the user interface computer program code 128 provides instructions relating to how the image should be modified, using the graphics computer program code 210, based on the user input 118. In the example of FIG. 2, the user interface computer program code 128 and the graphics computer program code 210 may both be written in JavaScript and may be portions of the same piece of code. For example, the user interface computer program code 128 may include at least one line of JavaScript code that controls the effect of a user input 118 on the modification of the decoded image data 206. The graphics computer program code 210 in this example may include at least one other line of JavaScript code that controls the modification of the decoded image data 206 itself, based on the user input 118. In other examples, a line or portion of code may be considered to correspond to both user interface computer program code 128 and graphics computer program code 210, for example if this portion of code relates both to receipt of the user input and modification of the decoded image data 206 based on the user input.

In examples in which the user interface computer program code 128 is derived from at least part of the additional data 200, the programming interface 120 for the user interface 122 may merely be used to extract a particular parameter from the interaction 124 of the user with the user interface 122. This extracted parameter may then be passed to the user interface computer program code 128 as an input. In such cases, there may be additional computer program code associated with the programming interface 120 for the user interface 122, which is for example used in the extraction of the parameter from the interaction 124. For example, this additional computer program code may be used to convert a particular gesture on a touchscreen display device with a parameter value for input to the user interface computer program code 128.

The user input 118 may represent various different inputs, which may be received using any suitable software or hardware such as a touchscreen, a mouse, a keyboard, an image capture device or a joystick. For example, the user input may include depth data representing a change in viewpoint of a user. For example, the user may be able to provide input, such as via a touchscreen or an input device such as a mouse, indicating a change in their viewing position relative to a display device displaying the image. By assessing the change in the user's viewpoint, the image can be modified accordingly. For example, the image may be modified to account for a change in perspective of the user or to compensate for the movement of the user, for example so it appears to the user as if the image has remained at a substantially constant viewing angle.

Figure 3:
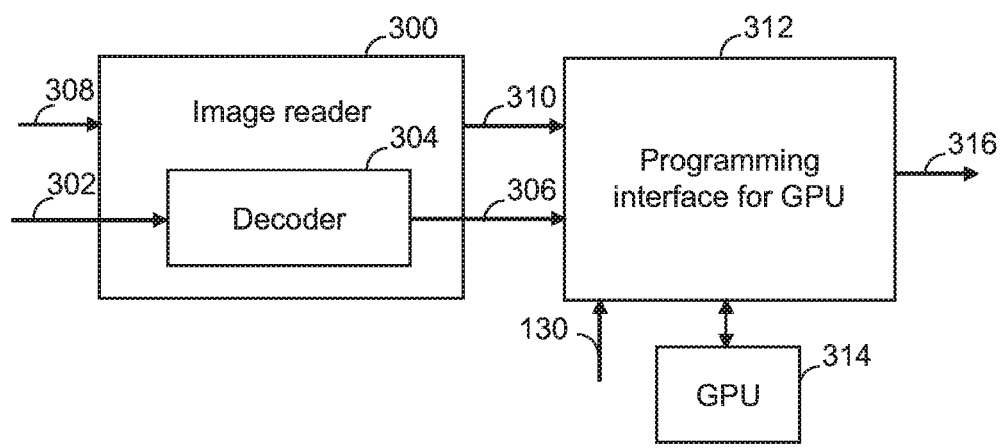
FIG. 3 is a schematic diagram showing a method according to yet further examples.

In other examples, such as the example of FIG. 3, the depth data may not arise from a direct user input. Instead, the depth data may be calculated or determined for example using a processor such as a central processing unit (CPU) of a computing device coupled to the display device displaying the image.

Features of FIG. 3 similar to those of FIG. 1 are labelled with corresponding reference numerals incremented by 100; corresponding descriptions are to be taken to apply. FIG. 3 is similar to FIG. 1 except that depth data 130 is also passed to the programming interface 312 for the graphics processor 314. The depth data 130 may, for example, be generated based on an analysis or processing of images of the user, for example images of the user captured at a plurality of different points in time. For example, a video of the user may be captured and keypoints of the image, which typically correspond with distinctive points or regions of the image, may be identified and tracked over a plurality of frames of the video, such as 3 to 5 consecutive frames. The keypoints may be selected to correspond with certain features of the human face. For example, the images of the user may be analysed to extract regions corresponding with a human eye, which may then be tracked to identify movement of the eye of the user over time. For example, the Kalman filter may be used to track the movement of the user from the video, although other tracking algorithms may be used in other examples. The change in viewpoint of the user may therefore be determined from the tracked movement of the user.

In the example of FIG. 3, the graphics computer program code 310 derived from the additional data 308 includes instructions for modification of the decoded image data 306 to transform the image in correspondence with the change in the viewpoint of the user. For example, the decoded image data 306 may be modified to move the image in the same direction as the user on the display device or to otherwise transform the image based on the change in the user's viewpoint. In this way, the graphics computer program code 310 is able to, for example, compensate for the change in the viewpoint of the user.

Figure 4:
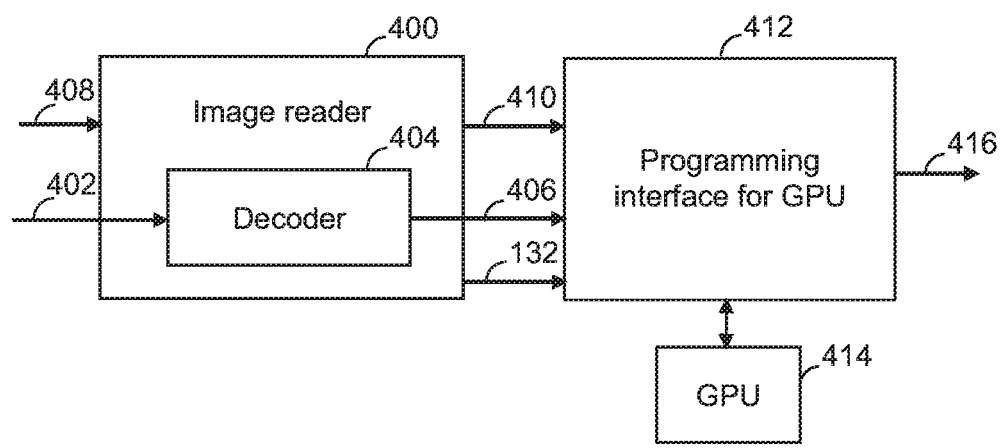
FIG. 4 is a schematic diagram showing a method according to still further examples.

FIG. 4 relates to a further example of the method that is also similar to FIG. 1. Features of FIG. 4 similar to those of FIG. 1 are labelled with corresponding reference numerals incremented by 100; corresponding descriptions are to be taken to apply. In FIG. 4, the method further includes deriving image-related data 132 from at least part of the additional data 408. As explained further above for the derivation of the computer program code from at least part of the additional data, deriving of data such as the image-related data 132 may involve processing other data, such as the at least part of the additional data 408, or merely selecting, accessing or extracting the relevant portion of the other data, such as the at least part of the additional data 408 that corresponds with image-related data 132. As described further below with reference to FIGS. 6a and 6b, in other examples, the image-related data 132 may not be derived from at least part of the additional data 408 but may instead be derived from the encoded or decoded image data, or from a combination of any two or more of the additional image data, the encoded image data or the decoded image data.

The image-related data 132 may include any data related to an image, which may be the same as or different from the image represented by the decoded image data. Examples of image-related data are given further below. The image-related data 132 is passed, along with the decoded image data 406 and the graphics computer program code 410, to the programming interface 412 for the graphics processor 414 for modification of the decoded image data 406 using the image-related data 132.

Figure 5:
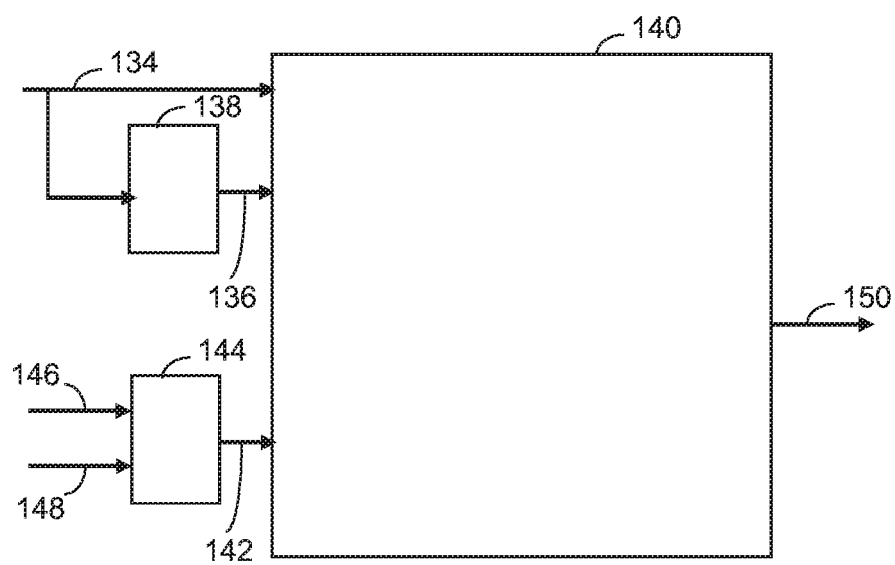
FIG. 5 is a schematic diagram showing a tone mapping module according to examples.

FIG. 5 illustrates an example of image-related data 132. In FIG. 5, the image is a first image and the decoded image data is first decoded image data 134 representing the first image. In this example, the image-related data includes second decoded image data 136 representing a second image. In FIG. 5, the second decoded image data 136 is derived from the first decoded image data 134 by applying a spatially-variant tone mapping operation to the first decoded image data 134 using an initial tone mapping module 138. However, in other examples, the second decoded image data 136 may not have been derived from the first decoded image data 134 in this way. For example, the second decoded image data 136 may represent a version of the image with a different relationship to the version represented by the first decoded image data 134, such as a version of the image with different coloring or with a particular transformation applied with respect to the version represented by the first decoded image data 134.

Data for deriving the second decoded image data 136 may be stored as at least part of the additional data, for example as metadata associated with the encoded image data or in a header portion of a file such as a JPEG or JPEG XT file. For example, the additional data may include second encoded image data representing the second image, which is encoded to reduce storage requirements, where, in the example of FIG. 5, the second image is a tone mapped version of the first image. The second decoded image data 136 can be derived from the second encoded image data of the additional data by decoding the second encoded image data to obtain the second decoded image data 136. In other examples, the additional data may include the second decoded image data 136 itself, which typically does not require further decoding. In these other examples, the second decoded image data 136 may be derived from the additional data merely by accessing the portion of the additional data corresponding to the second decoded image data 136.

The initial tone mapping module 138 in FIG. 5 is arranged to apply a non-zero, for example a maximal, amount of spatially-variant tone mapping to the first decoded image data 134 to obtain the second decoded image data 136. The Orthogonal Retina-Morphic Image Transform (ORMIT) algorithm may be used by the initial tone mapping module 138, although other tone mapping algorithms may be used in other examples. The strength of the tone mapping transformation applied by the initial tone mapping module 138, which may take a value between 0 and 1, may be considered to represent an amount of spatially-variant tone mapping, for example an amount or magnitude by which each pixel's intensity or brightness is altered by the tone mapping operation. The strength may be different for different pixels in the image, in order to achieve an amount of tone mapping which varies across the image. For example, the strength may vary in accordance with pixel intensity so that the tone mapping is stronger (for example with a higher strength) in darker parts of the image with low pixel intensity values, and is weaker in brighter parts of the image. This allows stronger enhancement of the shadows without affecting the bright regions.

Although the initial tone mapping module 138 is illustrated as a separate module in FIG. 5, in other examples, the initial tone mapping module 138 may be integrated with the tone mapping module 140.

The tone mapping module 140 of FIG. 5 receives the first decoded image data 134, the second decoded image data 136 and an input value 142 representing an amount of spatially-variant tone mapping. The input value 142 has been derived by an input value derivation module 144 from reference tone mapping strength data 146 and further reference tone mapping strength data 148. The input value derivation module 144 derives the input value 142 by combining the reference tone mapping strength data 146 and the further tone mapping strength data 148 to generate combined tone mapping strength data. The input value 142 is equal to the combined tone mapping strength data in this example although in other examples the input value 142 may be based on further processing of the combined tone mapping strength data. Although, in this example, the input value 142 is derived by processing the reference tone mapping strength data 146 with the further tone mapping strength data 148, in other examples, the input value used as an input to a tone mapping module such as that of FIG. 5 may be equal to the reference tone mapping strength parameter itself. In such cases, the further tone mapping strength data may be absent.

The image-related data may include the reference tone mapping strength data 146 and/or the further tone mapping strength data 148. For example, the reference tone mapping strength data 146 and/or the further tone mapping strength data may be metadata associated with the encoded image data, and may be stored in a header of a JPEG or JPEG XT file as part of the additional data. In other examples, however, the reference tone mapping strength data 146 and/or the further tone mapping strength data 148 may be received based on a user input, for example via a user interface such as that described with reference to FIG. 2. Alternatively, the reference tone mapping strength data 146 and/or the further tone mapping strength data 148 may be received from other components, such as other software or hardware elements or applications of a computing system used for implementing the method associated with FIG. 5.

In examples such as FIG. 5, the reference tone mapping strength data 146 and the further reference tone mapping strength data 148 may depend on different parameters or properties. For example, the reference tone mapping strength data 146 may depend on at least one of: a pre-determined value; a display property of a display device configured to display an output image based on the output image data; an ambient light level; or an application property of an application for use in displaying the modified image represented by the modified decoded image data. The further reference tone mapping strength data 148 may depend on at least one of these properties other than the property or properties that the reference tone mapping strength data 146 depends on, or on the same property or properties upon which the reference tone mapping strength data 148 depends.

The pre-determined value may be, for example, a value that a content creator or image supplier has determined is an optimal or desired tone mapping to obtain a desired output image for viewing. For example, the creator or supplier of the image may have ascertained that the image quality of the image is optimal in particular viewing conditions with a particular reference tone mapping strength parameter used as an input to the tone mapping operation. This may be determined for example by adjusting the tone mapping strength parameter to adjust the strength of the tone mapping applied to the image, analyzing the display quality of the output image after the application of the tone mapping operation, for example by eye or electronically, and storing the tone mapping strength parameter corresponding with the optimal display quality, for example as part of the image-related data, as the reference tone mapping strength data representing the reference tone mapping strength parameter. The viewing conditions the reference tone mapping strength parameter is optimized for may be relatively dark viewing conditions. In such cases, the reference tone mapping strength parameter may be zero, for example such that the tone mapping operation does not alter the image data representing, so that the output image and the input image are the same. In other cases, the reference tone mapping strength parameter may be non-zero. The reference tone mapping strength parameter typically depends on the content of the image. For example, where the image includes human skin, the reference tone mapping strength parameter may be non-zero as human skin has a limited brightness, and therefore may be enhanced by application of a tone mapping operation, for example to amplify detail in the skin.

The display property of the display device may be any property, characteristic or attribute that may affect the display quality of the output image, which in this example is the modified image. For example, the display property may be a luminance of the display device, e.g. a maximum brightness or intensity of light emitted from a backlight for illuminating pixels of the display device or a maximum pixel luminance, or a display device type. Typically, a different amount of tone mapping is required for different types of display device, for example liquid crystal display devices (LCDs) compared with organic light emitting diode display devices (OLEDs), to achieve a given display quality of an output image, for example with a given amount of detail visible in dark regions of the output image.

Where the reference tone mapping strength data 146 and/or the further reference tone mapping strength data 148 depend on the ambient light level, the ambient light level can be measured for example by an ambient light sensor. The ambient light sensor may be coupled to or integral with the computing device. Such an ambient light sensor may include one or more photodetectors; the use of multiple photodetectors may increase the reliability of the measurement of diffuse ambient light.

As explained above, in some cases the reference tone mapping strength data 146 and/or the further reference tone mapping strength data 148 depend on an application property of an application for use in displaying the modified image based on the modified decoded image data. An application property is for example a property specified by the developer, manufacturer or designer of the application that is intended for use in displaying the modified image, for example a web browser or other application capable of displaying images. The application property may for example specify that images should be displayed with a particular tone mapping, for example where it is desired to give images displayed using the application a particular "look". For example, the application developers may wish to display hyper-realistic images, with a high dynamic range, or murky images, with little detail visible, with a low dynamic range.

In some cases, the reference tone mapping strength data 146 depends on properties inherent to the image itself. The reference tone mapping strength parameter represented by the reference tone mapping strength data 146 may therefore be a pre-determined value. In such cases, the further reference tone mapping strength data 148 may depend on parameters or properties that are independent of the nature or content of the image. For example, the further tone mapping strength parameter represented by the further tone mapping strength data 148 may depend on the display property of the display device configured to display the modified image.

The reference tone mapping strength data 146 and the further tone mapping strength data 148 may be combined in various ways, as the skilled person will appreciate. For example, the reference tone mapping strength parameter represented by the reference tone mapping strength data 146 may be or correspond with a particular, e.g. a pre-determined, gain G. The gain G may be expressed as:

$$G = \frac{D_{TM}}{D} \quad (1)$$

where D is the dynamic range of an input image before the tone mapping operation and $D_{TM}$ is a pre-determined output dynamic range to be obtained after the tone mapping operation.

The input value a to the tone mapping operation may be derived from the gain G as follows:

$$\alpha = \frac{G-1}{G_{max}-1} \quad (2)$$

where G is the gain defined in (1), and $G_{max}$ is the maximum gain achievable with a maximum tone mapping strength.

Where the reference tone mapping strength data 146 and the further tone mapping strength data 148 are combined, both the reference tone mapping strength data 146 and the further tone mapping strength data 148 may correspond with different respective gain values. In such cases, the reference tone mapping strength data 146, denoted as a first gain $G_1$, and the further tone mapping strength data 148, denoted as a second gain $G_2$, may be multiplied together as follows to obtain a combined gain denoted as $G_C$:

$$G_C = G_1 * G_2 \qquad (3)$$

Similarly, the reference tone mapping strength data 146 may be combined with more than one set of further tone mapping strength data 148 by multiplying the first gain $G_1$ with the respective gain corresponding with each of set of further tone mapping strength data 148.

The combined strength parameter $\alpha_C$ may then be calculated as:

$$\alpha_C = \frac{G_C - 1}{G_{max} - 1} \qquad (4)$$

In such examples, the gain value corresponding with the reference tone mapping strength data 146 may depend on different parameters or properties than the gain value corresponding with the further tone mapping strength data 148, as described above.

As the skilled person will appreciate, other methods or algorithms may be used to combine the reference tone mapping strength data 146 and the further tone mapping strength data 148. For example where the reference tone mapping strength data 146 equals a tone mapping strength parameter $\alpha_1$ and the further tone mapping strength data 148 equals a different tone mapping strength parameter $\alpha_2$, the combined strength parameter $\alpha_C$ may be obtained by multiplying $\alpha_1$ and $\alpha_2$.

The reference tone mapping strength data 146 and the further tone mapping strength data 148 may be combined using software, hardware or a combination of software and hardware.

Although the example of FIG. 4 illustrates the input value 142 being derived by an input value derivation module 144, it is to be appreciated that in other examples the input value may be derived by other modules of the computing device. Alternatively, the input value derivation module may be a sub-module or part of another module of the computing device, such as the tone mapping module 138. In other examples in which the input value is equal to the reference tone mapping strength data, there may be no dedicated module to derive the input value from the reference tone mapping strength data. In such cases, the reference tone mapping strength data may be input directly to the tone mapping module 138 as the input value without further processing or manipulation.

In the example of FIG. 5, the tone mapping module 140 is arranged to tone map the image data using a method sometimes referred to as alpha-blending. In this example, the graphics computer program code may therefore include instructions for alpha-blending the first image represented by the first decoded image data 134 and the second image represented by the second decoded image data 136.

The first decoded image data 134 and the second decoded image data 136 are input to the tone mapping module 140 along with the input value 142. A relative contribution of the first decoded image data 134 and the second decoded image data 136 to the modified decoded image data 150 depends on the input value 142.

With the input value 142 calculated as the combined strength parameter $\alpha_C$ as described above, the pixel intensity values may be modified as:

$$I_{out} = I_1 * (1 - \alpha_C) + I_2 * \alpha_C \qquad (5)$$

where $I_{out}$ is the output pixel intensity value for the modified decoded image data 150, $I_1$ is the pixel intensity value from the first decoded image data 134 and $I_2$ is the pixel intensity value from the second decoded image data 136 obtained by applying a spatially-variant tone mapping operation to the first decoded image data 134.

Other blending schemes are also possible than that of equation (5). For example, the pixel intensity values may instead be modified as:

$$I_{out} = \sqrt{I_1^{2}*(1-\alpha_C) + I_2^{2}*\alpha_C} \qquad (6)$$

where $I_{out}$, $I_1$, $I_2$ and $\alpha_C$ are as previously defined.

The alpha-blending procedure may be considered to be an overlaying or combining of two versions of the same image; one with no tone mapping applied (corresponding to the first decoded image data 134) and one with non-zero tone mapping applied (corresponding to the second decoded image data 136), which may be with maximal tone mapping applied, for example. This process can be used to improve an image quality of the modified image. For example, the alpha-blending process can be used to enhance detail in certain parts of the image, such as dark parts, without adversely affecting other parts of the image.

The first decoded image data 134 may itself be tone mapped. For example, the first image represented by the first decoded image data 134 may have a first amount of spatially-variant tone mapping applied and the second image represented by the second decoded image data 136 may have a second amount of spatially-variant tone mapping, which may be different from the first amount. In the example of FIG. 5, the first amount of spatially-variant tone mapping is zero and the second amount of spatially-variant tone mapping is non-zero, but in other cases both the first and second amounts may be non-zero.

The output of the alpha-blending process in the example of FIG. 5 is modified decoded image data 150 representing a modified image. The modified image may be displayed on a display device (not shown).

Figure 6A:
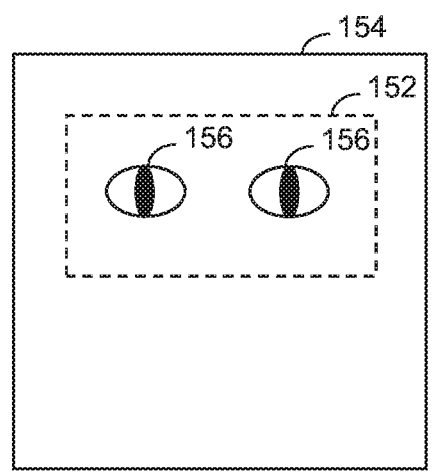
FIGS. 6a and 6b illustrate schematically an example of modification of an image.
Figure 6B:
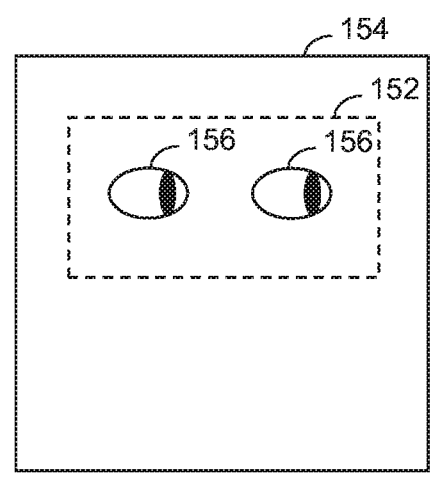

FIGS. 6a and 6b relate to another example of image-related data. In the example of FIGS. 6a and 6b, the image-related data includes local image data representing a portion 152 of the image 154. In this example, the graphics computer program code includes instructions for modifying the portion of the image. These instructions may relate to various different modifications of the portion of the image, for example a translation or a one or two dimensional transformation of the portion of the image or improvements to the display quality of the portion of the image such as a tone mapping or alteration of the contrast of the portion of the image.

For example, the instructions may be for modifying the portion of the image to enhance detail in the portion of the image. For example, the portion of the image the user is looking at or focusing on at a particular time can be determined by tracking the position of the eyes of a user over time, such as described with reference to FIG. 3. The local image data representing the portion of the image may then be derived from the encoded or decoded image data, for example by extracting or accessing the relevant part of the encoded or decoded image data that corresponds to or represents the portion of the image. Thus, in this example, the image-related data may be derived from the encoded or decoded image data rather than at least part of the additional data. However, in other examples, the local image data may be derived from at least part of the additional data. For example, the additional data may include a copy of the encoded or decoded image data representing the image. The local image data may then be derived from this copy of the encoded or decoded image data stored as part of the additional data without requiring processing of the original encoded or decoded image data itself.

If the portion of the image is determined to be a dark portion, the strength of the tone mapping applied to the portion of the image may be increased to enhance or reveal details in the dark region of the image, based on the instructions. However, as will be appreciated, this is a non-limiting example and the portion of the image may be modified in different ways in other examples. Indeed, FIGS. 6a and 6b relate to a different example of modification of a portion of an image.

The portion 152 of the image 154 in the example of FIGS. 6a and 6b includes human eyes 156. In this case, the instructions are for modifying the portion of the image to simulate movement of the portion 152 of the image 154 relative to a further portion of the image, which in this case is the remainder of the image 154. The modification of the portion of the image in this example is based on identified movement of the eyes of the user, for example as described with reference to FIG. 3, although in other examples movement of the user may be identified differently or the portion of the image may be modified independently of movement of the user.

FIGS. 6a and 6b illustrate schematically this modification of the portion 152 of the image 154. In FIG. 6a, the pupils of the eyes 156 are located centrally. In contrast, in FIG. 6b, the pupils of the eyes 156 have been moved to the right, to simulate movement of the pupils in a rightwards direction. Accordingly, the image can be modified as shown in FIGS. 6a and 6b for example so it appears to a user as if the eyes 156 of the image are following the user. For example, the portion of the image may be modified based on input indicating movement of the user, such as that described above with reference to FIGS. 2 and 3. In the example of FIGS. 6a and 6b, the movement of the pupils of the eyes 156 in the image 154 to the right is in response to an identification of a rightwards movement of the user or the user's eyes with respect to the display device for displaying the image 154. However, in other examples, the relationship between the modification of the image and the movement of the user may be different. For example, the portion of the image may be moved or translated in an opposite direction to the movement of the user.

In the examples of FIGS. 5, 6a and 6b, the image-related data may further include an image modification strength parameter for deriving an input value for input to the graphics computer program code. The image modification strength parameter may for example be derived from the additional data, even in cases where other portions of the image-related data are derived from the encoded or decoded image data. In other words, the image-related data may be derived from a combination of the additional data and at least one of the encoded or decoded image data. Although, in other cases, the entirety of the image-related data may be derived from solely one of the additional data, the encoded image data or the decoded image data.

The input value may represent an amount of modification to apply to the decoded image data. For example, referring to FIG. 5, where the graphics computer program code includes instructions for alpha-blending the first image and the second image, for example using a tone mapping module 140 like the one of FIG. 5, the input value for input to the graphics computer program code may be the input value 142 described above. In this case, the image modification strength parameter may correspond to either or both of the tone mapping strength parameter 146 or the further tone mapping strength parameter 148, which are used to obtain the input value 142 as described above. For example, the image modification strength parameter may be a one or multi-dimensional parameter such that it may represent one or more values. Referring to FIG. 6, the image modification strength parameter in this example may represent an amount and/or direction of movement of a user, which may be used to derive an input value representing an amount and/or direction of movement of the portion of the image in response.

Figure 7:
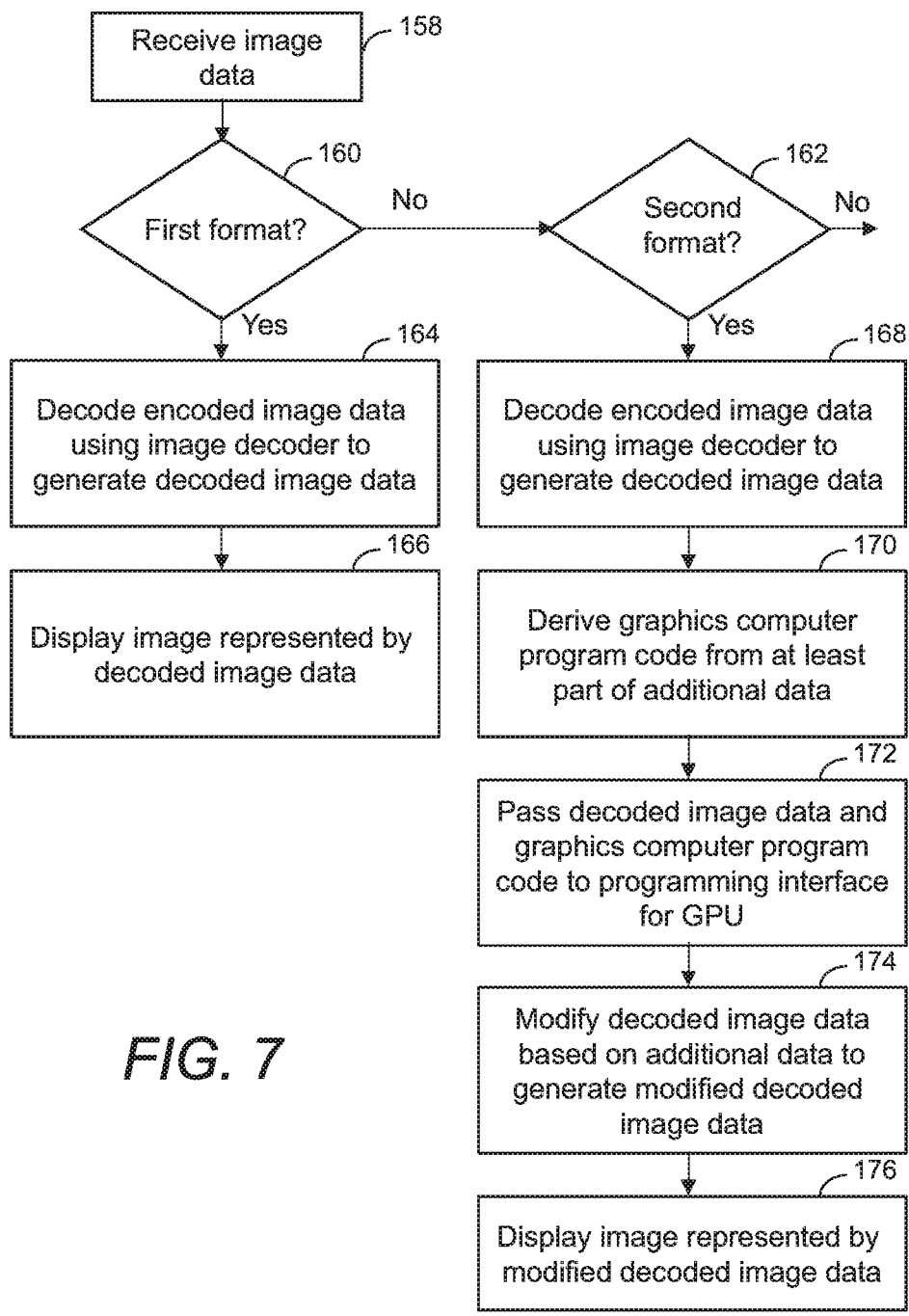
FIG. 7 is a flow diagram illustrating a method according to examples.

The method according to examples is further illustrated in the flow diagram of FIG. 7. In examples in accordance with FIG. 7, image data is received at block 158. Blocks 160 and 162 involve determining a format of the image data from at least a first format in which the image data includes encoded image data which may be decoded to generate decoded image data representing an image and a second format in which, in addition to including the encoded image data which may be decoded to generate the decoded image data representing an image, the image data also includes additional data which may, optionally, be read and used to modify the decoded image data. For example, the first format may be a legacy or existing format and the second format may be an upgraded or so-called "next generation" format.

As described above with reference to other examples, the encoded image data may be in a format compatible with a legacy image decoder which is not capable of deriving the graphics computer program code from the at least part of the additional data and passing the decoded image data, along with graphics computer program code, to a programming interface for a graphics processor for modification of the decoded image data.

In response to determining that the format is the first format, the encoded image data is decoded at block 164 to generate decoded image data. The image represented by the decoded image data is displayed at block 166, for example using a display device coupled to a computing system arranged to carry out the other aspects of the method.

In response to determining that the format is the second format, the encoded image data is decoded at block 168 to generate decoded image data. If the format is neither the first nor the second format, further processing (not shown in FIG. 7) may be applied to the image data to prepare the image for display or the image based on the image data may not be displayed.

Computer program code is derived from at least part of the additional data of the image data at block 170. The computer program code is graphics computer program code associated with a programming interface for a graphics processor, and is for modification of the decoded image data and may be similar to the graphics computer program code described in examples above.

At block 172, the decoded image data, along with the graphics computer program code, are passed to the programming interface for the graphics processor for modification of the decoded image data. The decoded image data is modified at block 174 based on the additional data to generate modified decoded image data representing the image after modification. Finally, the image represented by the modified decoded image data is displayed at block 176.

The method of examples in accordance with FIG. 7 therefore allows image data of different formats to be handled appropriately. For example, images represented by image data in either the first or second formats can be displayed successfully. In addition, image data in the second format can be modified before display, which can for example be used to enhance the viewing experience for a user. This provides flexibility for the processing of different image data of different formats.

Figure 8:
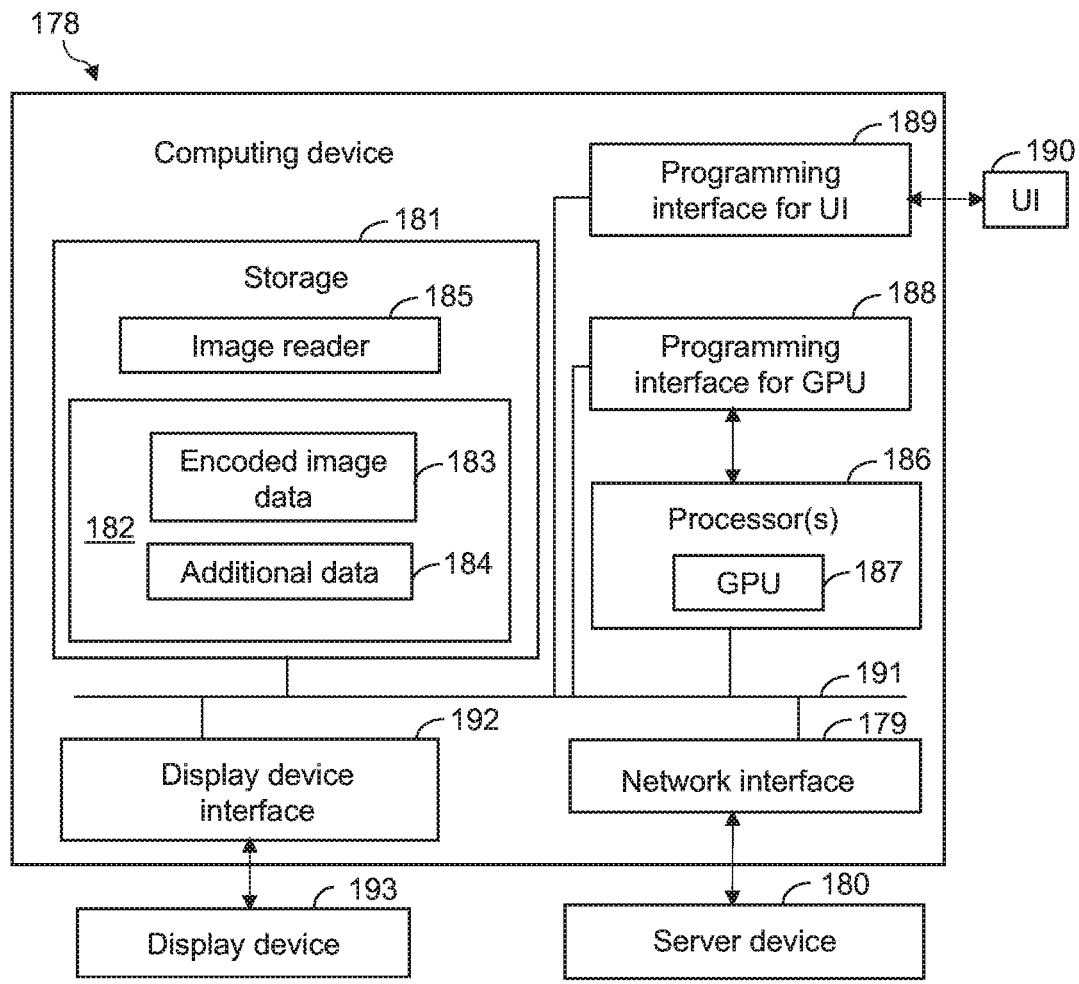
FIG. 8 is a schematic diagram showing an example of internal components of a computing device.

An overview of examples of internal components of an example computing device 178 for use with the method of processing an image according to the examples described herein is provided with reference to FIG. 8. The computing device 178 of FIG. 8 includes a network interface 179 to retrieve image data from a server device 180. The network interface 179 of the computing device 178 may include software and/or hardware components, such as a virtual network interface, an Ethernet port, a software driver and/or communications stack interacting with network hardware.

Storage 181 of the computing device 178 in the example of FIG. 8 stores image data 182 received at the network interface 179. The image data 182 in this example includes encoded image data 183 which may be decoded to generate decoded image data representing an image and additional data 184 which may, optionally, be read and used to modify the decoded image data. As described for previous examples, the encoded image data 183 may be in a format compatible with a legacy image decoder which is not capable of deriving graphics computer program code from the at least part of the additional data 184 and passing the decoded image data, along with the graphics computer program code, to a programming interface for a graphics processor for modification of the decoded image data.

The storage 181 may include at least one of volatile memory, such as a Random Access Memory (RAM) and non-volatile memory, such as Read Only Memory (ROM) or a solid state drive (SSD) such as Flash memory. The storage 181 in examples may include further storage devices, for example magnetic, optical or tape media, compact disc (CD), digital versatile disc (DVD) or other data storage media. The storage 181 may be removable or non-removable from the computing device 178.

At least one processor 186 is communicatively coupled to the storage 181 in the computing device 178 of FIG. 8. The at least one processor 186 in the example of FIG. 8 may include a microprocessor, a general-purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. In the example of FIG. 8, the at least one processor 186 includes a graphics processor 187, which in this case is a GPU such as the GPUs 114, 214, 314, 414 described with reference to FIGS. 1 to 4.

The storage 181 in the example of FIG. 8 includes computer program instructions configured to, when processed by the at least one processor 186, for example by the GPU 187, implement an image reader 185, which may be similar to the image readers 100, 200, 300, 400 described with reference to FIGS. 1 to 4. The computer program instructions may be stored in an accessible non-transitory computer-readable medium and loaded into memory, for example the storage 181, to implement the image reader 185.

The computing device 178 further includes a programming interface 188 for the graphics processor 187, which may be similar to the programming interfaces 112, 212, 312, 412 described with reference to FIGS. 1 to 4. There may also be a programming interface 189 for a user interface 190, which may be similar to the programming interface 120 for the user interface 122 described with reference to FIG. 2. However, in some cases, the programming interface for the user interface may be absent, for example if user input may be received directly by the programming interface 188 for the graphics processor 187.

The components of the computing device 178 in the example of FIG. 8 are interconnected using a systems bus 191. This allows data to be transferred between the various components. For example, the modified decoded image data generated by the method according to examples can be stored in the storage 181 and subsequently transmitted via the systems bus 191 from the storage 181 to a display device interface 192 for transfer to a display device 193 for display. The display device interface 192 may include a display port and/or an internal electronics interface, e.g. where the display device 193 is part of the computing device 178 such as a display screen of a smart phone. Therefore, when instructed by the at least one processor 186 via the display device interface 192, the display device 193 will display an image based on the modified decoded image data.

The above examples are to be understood as illustrative examples. Further examples are envisaged. For example, the examples given above refer to use of images in the JPEG or JPEG XT formats. However, it is to be appreciated that the method, systems and devices described above may be applied to or used with images stored in various other formats.

The examples described above use software to implement the method according to examples. However, in other examples, the method may be implemented using solely hardware or using a combination of hardware and software.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

Further examples are described in accordance with the following numbered clauses:

1. A method comprising:
   receiving image data comprising:
      a first data type comprising encoded image data to be decoded to generate decoded image data representing an image; and
      a second data type comprising additional data to be read and used to modify the decoded image data;
   decoding the encoded image data using an image decoder to generate the decoded image data; and
   modifying the decoded image data based on the additional data to generate modified decoded image data representing the image after modification, wherein the method comprises:
deriving computer program code from at least part of the additional data, the computer program code being graphics computer program code associated with a programming interface for a graphics processor, the graphics computer program code being for modification of the decoded image data; and
passing the decoded image data, along with the graphics computer program code, to the programming interface for the graphics processor for modification of the decoded image data.

2. The method according to Clause 1, wherein the encoded image data is in a format compatible with a legacy image decoder which is not capable of deriving the graphics computer program code from the at least part of the additional data and passing the decoded image data, along with the graphics computer program code, to the programming interface for the graphics processor for modification of the decoded image data.

3. The method according to Clause 1, wherein the legacy image decoder is a JPEG (Joint Photographic Experts Group) decoder.

4 The method according to any one of Clauses 1 to 3, wherein the method comprises:
receiving user input and passing the user input to the programming interface for the graphics processor for controlling the modification of the decoded image data in accordance with the user input.

5. The method according to Clause 4, wherein the receiving the user input comprises receiving the user input from a programming interface for a user interface, user interface computer program code for receiving the user input being associated with the programming interface for the user interface.

6. The method according to Clause 5, wherein the method comprises:
deriving further computer program code from at least part of the additional data, the further computer program code being the user interface computer program code which is associated with the programming interface for the user interface.

7. The method according to any one of Clauses 4 to 6, wherein the user input comprises depth data representing a change in viewpoint of a user.

8. The method according to any one of Clauses 1 to 7, comprising receiving depth data representing a change in viewpoint of a user, the graphics computer program code comprising instructions for modification of the decoded image data to transform the image in correspondence with the change in the viewpoint of the user.

9. The method according to any one of Clauses 1 to 8, wherein the method comprises:
deriving image-related data from at least part of any one of, or a combination of any two or more of:
the additional data, the encoded image data or the decoded image data;
passing the image-related data, along with the decoded image data and the graphics computer program code, to the programming interface for the graphics processor for modification of the decoded image data using the image-related data.

10. The method according to Clause 9, wherein the image is a first image, the decoded image data is first decoded image data, the image-related data comprises second decoded image data representing a second image, and wherein the graphics computer program code comprises instructions for alpha-blending the first image and the second image to generate the modified decoded image data.

11. The method according to Clause 10, wherein the first image has a first amount of spatially-variant tone mapping applied and the second image has a second amount of spatially-variant tone mapping applied.

12. The method according to Clause 10, wherein the first amount of spatially-variant tone mapping is zero and the second amount of spatially-variant tone mapping is non-zero.

13. The method according to any one of Clauses 10 to 12, comprising deriving the second decoded image data from the first decoded image data by applying a spatially-variant tone mapping operation to the first decoded image data.

14. The method according to any one of Clauses 9 to 13, wherein the image-related data comprises local image data representing a portion of the image and wherein the graphics computer program code comprises instructions for modifying the portion of the image.

15. The method according to Clause 14, wherein the instructions for modifying the portion of the image are for modifying the portion of the image to simulate movement of the portion of the image relative to a further portion of the image.

16. The method according to Clause 14, wherein the instructions for modifying the portion of the image are for modifying the portion of the image to enhance detail in the portion of the image.

17. The method according to any one of Clauses 9 to 16, wherein the image-related data comprises an image modification strength parameter for deriving an input value for input to the graphics computer program code, the input value representing an amount of modification to apply to the decoded image data.

18. The method according to any one of Clauses 1 to 17, wherein the additional data is metadata associated with the encoded image data.

19. The method according to any one of Clauses 1 to 18, wherein the receiving the image data comprises receiving the image data via a web browser capable of reading the encoded image data and the additional data.

20. A method comprising:
receiving image data;
determining a format of the image data from at least:
a first format in which the image data comprises a first data type comprising encoded image data to be decoded to generate decoded image data representing an image; and
a second format in which, in addition to comprising the first data type comprising encoded image data to be decoded to generate the decoded image data representing an image, also comprises a second data type comprising additional data to be read and used to modify the decoded image data;
in response to determining that the format is the first format:
decoding the encoded image data using an image decoder to generate the decoded image data; and
in response to determining that the format is the second format:
decoding the encoded image data using an image decoder to generate the decoded image data; and
modifying the decoded image data based on the additional data to generate modified decoded image data representing the image after modification,
wherein the method further comprises, in response to determining that the format is the second format:

deriving computer program code from at least part of the additional data, the computer program code being graphics computer program code associated with a programming interface for a graphics processor, the graphics computer program code being for modification of the decoded image data; and passing the decoded image data, along with the graphics computer program code, to the programming interface for the graphics processor for modification of the decoded image data.

21. The method according to Clause 20, wherein the encoded image data is in a format compatible with a legacy image decoder which is not capable of deriving the graphics computer program code from the at least part of the additional data and passing the decoded image data, along with the graphics computer program code, to the programming interface for the graphics processor for modification of the decoded image data.

22. A computing device comprising:
storage for storing image data comprising:
a first data type comprising encoded image data to be decoded to generate decoded image data representing an image; and
a second data type comprising additional data to be read and used to modify the decoded image data;
at least one processor communicatively coupled to the storage, the at least one processor comprising a graphics processor;
a programming interface for the graphics processor; and
an image reader operable to:
decode the encoded image data to generate the decoded image data;
read the additional data; and
derive computer program code from at least part of the additional data, the computer program code being graphics computer code associated with the programming interface for the graphics processor, wherein the programming interface for the graphics processor is operable to:
receive the decoded image data, along with the graphics computer program code; and
modify the decoded image data based on the graphics computer program code to generate the modified decoded image data.

23. The computing device according to Clause 22, wherein the encoded image data is in a format compatible with a legacy image decoder which is not capable of deriving the graphics computer program code from the at least part of the additional data and passing the decoded image data, along with the graphics computer program code, to the programming interface for the graphics processor for modification of the decoded image data.

The invention claimed is:
1. A method comprising:
receiving image data comprising:
a first data type comprising encoded image data to be decoded to generate decoded image data representing an image; and
a second data type comprising additional data to be read and used to modify the decoded image data;
decoding the encoded image data using an image decoder to generate the decoded image data;
deriving computer program code from at least part of the additional data, the computer program code being graphics computer program code associated with a programming interface for a graphics processor, the graphics computer program code being for modification of the decoded image data;

deriving image-related data from at least part of any one of, or a combination of any two or more of: the additional data, the encoded image data, or the decoded image data, wherein the image is a first image, the decoded image data is first decoded image data, the image-related data comprises second decoded image data representing a second image, and the graphics computer program code comprises instructions for alpha-blending the first image and the second image to generate the modified decoded image data; and passing the image-related data and the decoded image data, along with the graphics computer program code, to the programming interface for the graphics processor for modification of the decoded image data using the image-related data to generate modified decoded image data representing the image after modification.

2. The method according to claim 1, wherein the encoded image data is in a format compatible with a legacy image decoder which is not capable of deriving the graphics computer program code from the at least part of the additional data and passing the decoded image data, along with the graphics computer program code, to the programming interface for the graphics processor for modification of the decoded image data.

3. The method according to claim 2, wherein the legacy image decoder is a JPEG (Joint Photographic Experts Group) decoder.

4. The method according to claim 1, wherein the method comprises:
receiving user input and passing the user input to the programming interface for the graphics processor for controlling the modification of the decoded image data in accordance with the user input.

5. The method according to claim 4, wherein the receiving the user input comprises receiving the user input from a programming interface for a user interface, user interface computer program code for receiving the user input being associated with the programming interface for the user interface.

6. The method according to claim 5, wherein the method comprises:
deriving further computer program code from at least part of the additional data, the further computer program code being the user interface computer program code which is associated with the programming interface for the user interface.

7. The method according to claim 4, wherein the user input comprises depth data representing a change in viewpoint of a user.

8. The method according to claim 1, comprising receiving depth data representing a change in viewpoint of a user, the graphics computer program code comprising instructions for modification of the decoded image data to transform the image in correspondence with the change in the viewpoint of the user.

9. The method according to claim 1, wherein the first image has a first amount of spatially-variant tone mapping applied and the second image has a second amount of spatially-variant tone mapping applied.

10. The method according to claim 1, comprising deriving the second decoded image data from the first decoded image data by applying a spatially-variant tone mapping operation to the first decoded image data.

11. The method according to claim 1, wherein the image-related data comprises local image data representing a portion of the image and wherein the graphics computer program code comprises instructions for modifying the portion of the image.

12. The method according to claim 11, wherein the instructions for modifying the portion of the image are for modifying the portion of the image to simulate movement of the portion of the image relative to a further portion of the image.

13. The method according to claim 11, wherein the instructions for modifying the portion of the image are for modifying the portion of the image to enhance detail in the portion of the image.

14. The method according to claim 1, wherein the image-related data comprises an image modification strength parameter for deriving an input value for input to the graphics computer program code, the input value representing an amount of modification to apply to the decoded image data.

15. The method according to claim 1, wherein the receiving the image data comprises receiving the image data via a web browser capable of reading the encoded image data and the additional data.

16. The method according to claim 1, wherein the additional data is metadata associated with the encoded image data.

17. A method comprising:
receiving image data;
determining a format of the image data from at least:
a first format in which the image data comprises a first data type comprising encoded image data to be decoded to generate decoded image data representing an image; and
a second format in which, in addition to comprising the first data type comprising encoded image data to be decoded to generate the decoded image data representing an image, also comprises a second data type comprising additional data to be read and used to modify the decoded image data;
in response to determining that the format is the first format:
decoding the encoded image data using an image decoder to generate the decoded image data; and
in response to determining that the format is the second format:
decoding the encoded image data using an image decoder to generate the decoded image data;
deriving computer program code from at least part of the additional data, the computer program code being graphics computer program code associated with a programming interface for a graphics processor, the graphics computer program code being for modification of the decoded image data;
deriving image-related data from at least part of any one of, or a combination of any two or more of: the additional data, the encoded image data, or the decoded image data,
wherein the image is a first image, the decoded image data is first decoded image data, the image-related data comprises second decoded image data representing a second image, and wherein the graphics computer program code comprises instructions for alpha-blending the first image and the second image to generate the modified decoded image data; and
passing the image-related data and the decoded image data, along with the graphics computer program code, to the programming interface for the graphics processor for modification of the decoded image data using the image-related data to generate modified decoded image data representing the image after modification.

18. The method according to claim 17, wherein the encoded image data is in a format compatible with a legacy image decoder which is not capable of deriving the graphics computer program code from the at least part of the additional data and passing the decoded image data, along with the graphics computer program code, to the programming interface for the graphics processor for modification of the decoded image data.

19. A computing device comprising:
storage for storing image data comprising:
a first data type comprising encoded image data to be decoded to generate decoded image data representing an image; and
a second data type comprising additional data to be read and used to modify the decoded image data;
at least one processor communicatively coupled to the storage, the at least one processor comprising a graphics processor;
a programming interface for the graphics processor; and
an image reader operable to:
decode the encoded image data to generate the decoded image data;
read the additional data;
derive computer program code from at least part of the additional data, the computer program code being graphics computer code associated with the programming interface for the graphics processor; and
derive image-related data from at least part of any one of, or a combination of any two or more of the additional data, the encoded image data, or the decoded image data,
wherein the image is a first image, the decoded image data is first decoded image data, the image-related data comprises second decoded image data representing a second image, and wherein the graphics computer program code comprises instructions for alpha-blending the first image and the second image to generate the modified decoded image data,
wherein the programming interface for the graphics processor is operable to:
receive the image-related data and the decoded image data, along with the graphics computer program code; and
modify the decoded image data based on the graphics computer program code and the image-related data to generate the modified decoded image data.

20. The computing device according to claim 19, wherein the encoded image data is in a format compatible with a legacy image decoder which is not capable of deriving the graphics computer program code from the at least part of the additional data and passing the decoded image data, along with the graphics computer program code, to the programming interface for the graphics processor for modification of the decoded image data.

* * * * *